United States Patent Office 3,441,424
Patented Apr. 29, 1969

3,441,424
GLASS SURFACES COATED WITH DECORATIVE ORGANIC COATINGS
Nicholas C. Bolgiano, Lancaster County, Pa., assignor to Armstrong Cork Company, Lancaster, Pa., a corporation of Pennsylvania
No Drawing. Filed Jan. 25, 1965, Ser. No. 427,979
Int. Cl. B41m 1/34; B44d 1/16; C03c 17/32
U.S. Cl. 117—12         5 Claims

ABSTRACT OF THE DISCLOSURE

A glass surface having a coating of 5–100 millimicrons of a refractory metal oxide coating, and having an additional top coating of an ink having a binder of a cured terpolymer consisting essentially of 50–70% by weight styrene, 20–50% by weight 2-ethylhexyl acrylate, and 2–14% by weight of an organic acid selected from the group consisting of acrylic acid and methacrylic acid.

---

The invention relates generally to glass surfaces coated with decorative organic coatings. More particularly, the invention relates to a glass surface having labels, decorations, and the like printed thereon, the printed matter being scratch resistant, tough, and resistant to alkaline conditions commonly found in bottling lines. Still more particularly, the invention relates to a glass surface covered with printed matter which has excellent adhesion to the glass.

Copending application Ser. No. 142,766, now abandoned, relates to a printing ink and to a glass container having a label thereon made from the printing ink. Copending application Ser. No. 278,398, now abandoned, relates to the particular terpolymer used in the binder of the printing ink described in application Ser. No. 142,766.

Both of these copending applications solve the problem of supplying a binder for a printing ink for a particular application to glass bottles. The inks thus strongly adhere to a glass surface while presenting a tough, strong film in the cured condition which is resistant to scratching, abrasion, and alkaline washes as encountered in bottling lines. Yet the binder for those inks represents a compromise in that relatively large amounts of acrylic acid (or methacrylic acid) must be present as a constituent in the terpolymer which constitutes the binder. The acrylic acid is necessary to achieve excellent adhesion to the glass. At the same time, the presence of the acrylic acid embrittles the polymer and thus lowers its resistance to alkalies. Although it has been desirable in the past to describe a terpolymer with a higher amount of styrene and a lower amount of acrylic acid, such has not been possible due to the reduction of the adhesion to glass of the printing ink containing the terpolymer binder.

By means of the present invention, a way has been found to accomplish this highly desirable result. It is therefore a primary object of the present invention to supply a terpolymer which will in combination with a glass surface present a tough, strong, scratch and abrasion resistant film which will also better withstand the effects of alkaline washes.

This object is accomplished in an exceedingly effective and straightforward manner. The invention contemplates a glass surface coated with 5–100 millimicrons of a refractory metal oxide coating. The refractory metal oxide coating has printed thereon an ink having a binder of a cured terpolymer. The terpolymer consists essentially of 50–70% by weight styrene, 20–50% by weight 2-ethylhexyl acrylate, and 2–14% by weight of an organic acid selected from the group consisting of acrylic acid and methacrylic acid.

The styrene imparts hardness to the cured terpolymer and thus increases the abrasion resistance of printing ink made from the terpolymer. Additionally, the increased amounts of styrene in the present terpolymer enhance the alkali resistance of the printing ink. Amounts of styrene used outside the limits stated above have a deleterious effect on the properties of the printing ink where the changes in the amounts or styrene are made at the expense of the acrylic acid or the 2-ethylhexyl acrylate. The 2-ethylhexyl acrylate imparts plasticity to the final cured film, eliminating the brittleness which otherwise would render the film unsuitable for the purpose intended. The methacrylic acid or acrylic acid supplies cross-linking sites for the final terpolymer and also, as in the past, contributes to the excellent adhesion of the cured terpolymer to glass. However, in the present terpolymer, the presence of larger amounts of carboxylic acid groups is rendered unnecessary since the cured terpolymer does not adhere to the glass structure itself. Instead, the cured terpolymer adheres to a refractory metal oxide coating which is itself part of the glass structure. The refractory metal oxide coating will be described below.

The terpolymer of the present invention may readily be made by forming a mixture of the three monomers and adding the mixture to a solvent system or emulsion system in which the polymeric reaction is to take place. Polymerization temperatures are generally in the range of 70°–100° C., followed, after all the monomers have been added, by additional period to ensure completion of the reaction. Free radical initiators of known types such as the organic peroxides or the persulfates should be used in the solvent system or emulsion system. If the solvent system is to be used, any suitable solvent mixture which hold the final terpolymer in solution will suffice. Thus, hydrocarbon solvents such as toluene, benzene, the xylenes and other liquid aromatics and alkylated aromatics may be used. Chlorinated aromatics and chlorinated aliphatics may be added to the mixture. Other suitable solvents include the alcohols and ketones, particularly in suitable blends with the various hydrocarbon solvents. Dimethylformamide may be used. In preparing the polymerization system, it is generally preferred that the polymerizable ingredients comprise 40–60% by weight of the system, the balance being the solvent mixture in the case of the solvent system or the water in the case of the emulsion system. Where an emulsion system is used, the usual emulsifying agents such as nonionic emulsifying agents and anionic emulsifying agents may be used. The solvent system or emulsion system should be stirred during polymerization and is preferably maintained under a blanket of inert gas such as nitrogen. Reaction periods generally run 2–10 hours, depending on the exact temperature used and on the rate of addition of the monomer mixture to the solvent or emulsion system. Molecular weights will be achieved generally in the range of 60,000–120,000, as measured by the light-scattering method, for the polymer made in the solvent system, and substantially higher for the polymer made in the emulsion system. The intrinsic viscosity of the terpolymer made in the solvent system will measure in the range of 0.2–0.3 in dioxane solvent at 30° C., and will preferably be about 0.25.

On completion and cooling of the solution or emulsion of terpolymer, the organic epoxy curing agent having no reactive groups on a molecule other than the epoxy group will be dispersed or dissolved in the terpolymer solution or emulsion just prior to use. These epoxy compounds are known curing agents for addition polymers of the type described herein, but when used with the particular terpolymer herein described, produce tough, strong, abrasion-resistant films under elevated temperatures, resistant when cured on glass even to caustic washes and dips. Many epoxy compounds serve as suitable curing agents for the terpolymer as described in the aforesaid copending application. There may be used limonene dioxide, dicyclopentadiene dioxide, the diglycidyl ether of bis-phenols, and the like. These epoxy compounds will generally have at least about 7% by weight oxirane oxygen. Put another way, the epoxy curing agent will be added to the terpolymer solution in an amount of about 5–25% by weight of the epoxy curing agent based on the weight of the terpolymer.

Curing of the terpolymer is accomplished by subjecting a thin film or a paint film containing the terpolymer of the present invention plus the epoxide curing agent to elevated temperature. It is preferred to use at least 0.6 to 1.2 equivalents of epoxide per equivalent of carboxylic acid. The general range will be about 0.2 to 1.5 equivalents of epoxide per carboxylic acid equivalent. Cure temperatures range from 250°–450° F., with shorter times being required at higher temperatures. A temperature of about 300° F. will require about 2 hours cure time. A temperature of about 400° F. will require about 25 minutes cure time. Small amounts, generally less than 1% by weight of the epoxy curing agent, of amines such as dimethylamine, butylamine, dimethylaminophenol, benzyldimethylamine, and the like may be used to hasten the cure. Increased amounts of these amines will also reduce the temperature required to cure and cross-link the terpolymer. Temperature reduction is achieved when amines in the amount of 0.1–2.0% by weight of the epoxy curing agent are used. The resulting cured film will have excellent acid resistance as well as unusually high alkali resistance.

The refractory metal oxide coating is applied to the glass surface prior to the application of the printing ink having the binder of the terpolymer described above. The application of the refractory metal oxide coating to the glass is accomplished in known manner. These processes are fully described in U.S. Patent No. 2,831,780—Deyrup issued April 22, 1958, and U.S. 2,898,496—Clark, issued Aug. 4, 1959. The teachings of both these patents are hereby incorporated herein by reference. Briefly, a liquid metallo-organic compound is sprayed or otherwise applied to the hot glass surface. The treated glass surface is then heated to pyrolyze the metallo-organic compound and leave the refractory metal oxide coating on the glass surface. The metallo-organic compounds of aluminum, titanium and zirconium such as aluminum ethoxide, aluminum isopropoxide (tri-isopropyl aluminate), tetraisopropyl titanate, and tetra-t-butyl zirconate are all usable. Other metal polyhalides such as tin tetrachloride, antimony pentachloride, germanium tetrachloride, and vanadium tetrachloride may be used. The preferred compound is tetraisopropyl titanate. The finished refractory metal oxide coating should have a thickness in the range of 5–100 millimicrons. Coatings less than 5 millimicrons do not allow sufficiently strong adherence of the printing ink of the present invention having the reduced amount of carboxylic acid groups in the binder thereof. On the other hand, coatings thicker than about 100 millimicrons have a linear depth which begins to approach the length of one-quarter the wave length of light and thus may begin to impart undesirable iridescent colors and other optical effects to the glass surface.

After the liquid coating has been applied to the hot glass surface, and the coating has been pyrolyzed to produce the refractory metal oxide coating, the treated glass surface may be cooled and is then in a receptive condition for application of the printing ink containing the terpolymer described herein. The printing ink is prepared in known manner by dissolving or dispersing the organic epoxy curing agent in the pigmented terpolymer solution.

The solution or suspension of terpolymer in water or preferably an inert organic solvent within the amount stated above requires only the addition of suitable pigment to be made into an excellent printing ink for printing on treated glass surfaces. A preferable pigment is pigment grade titanium dioxide which will generally be added in an amount of 70–200% by weight pigment based on the weight of the terpolymer plus the epoxy curing agent. Dyes may be added to tint the printing ink in any desirable manner. In any case, the mixture of vehicle, pigment and terpolymer is preferably subjected to the action of an attrition mill such as a ball mill for a suitable period of time, for example, overnight, in order to accomplish the thorough dispersion necessary in printing inks. The epoxide curing agent and the amine, if any, are then added and thoroughly intermixed. The solids content of the printing ink may be adjusted generally to within the range of about 50–80% by weight, depending on the precise viscosity desired and depending on the particular printing machine to be used.

After the ink of the present invention has been printed on treated glass, the ink is cured by subjecting the surface to heat at elevated temperature. Good cure is produced by subjecting the ink to a temperature of about 300° F. for periods of two hours, although higher temperatures will allow shorter times. Temperatures up to the point of decomposition of the terpolymer may be used for curing. The amine curing accelerators lower the temperature necessary to form the tough, strong coating and where such amine accelerators are used, the cure temperature may be reduced to temperatures in the range of about 150°–300° F.

On cooling, the cured printing ink of the present invention will be found to adhere well to the treated glass as above described after a 30-minute soaking in 3% caustic (sodium hydroxide) at 165° F. The printed label remains unharmed for extended periods of time in plain water maintained at 165° F.

The following examples illustrate several embodiments of the invention. All parts are by weight unless otherwise stated.

EXAMPLES

A series of seven terpolymers was made by maintaining the following mixtures at 160° F. for 16 hours with agitation in sealed glass containers.

TABLE 1

| Ingredients | Parts by weight of ingredient | | | | | | |
|---|---|---|---|---|---|---|---|
| | 1 | 2 | 3 | 4 | 5 | 6 | 7 |
| Carbitol acetate | 222 | 222 | 222 | 222 | 222 | 222 | 222 |
| Styrene | 182 | 162 | 162 | 162 | 135 | 135 | 135 |
| 2-ethylhexyl acrylate | 61 | 81 | 95 | 101.3 | 108 | 121 | 128.5 |
| Acrylic acid | 27 | 27 | 13.5 | 6.7 | 27 | 13.5 | 6.7 |
| Benzoyl peroxide | 4.5 | 4.5 | 4.5 | 4.5 | 4.5 | 4.5 | 4.5 |
| Dodecyl mercaptan | 1.2 | 1.1 | 1.2 | 1.2 | 1.2 | 1.1 | 1.2 |

The resulting seven polymers had the following characteristics:

TABLE 2

| | 1 | 2 | 3 | 4 | 5 | 6 | 7 |
|---|---|---|---|---|---|---|---|
| Solids (weight percent) | 55.9 | 51.7 | 48.2 | 54.5 | 48.5 | 43.4 | |
| Viscosity (centipoises) | 22,000 | 6,200 | 3,400 | 18,000 | 4,200 | 3,000 | |

A series of inks was made up using these terpolymers as a binder. The ink formulations were as follows:

Yellow ink—100 parts of the No. 2 polymer above, plus 0.38 part red pigment (RT5370 Du Point Red), 15.10 parts yellow pigment (YT4590 Du Pont Yellow), and 26.40 parts white pigment (R900 Du Pont White).

Red ink—100 parts of the No. 2 polymer above, and 29.5 parts red pigment (RT5370 Du Pont Red).

Black ink—100 parts of the No. 2 polymer above, and 30.3 parts black pigment (Witco F-1).

To each ink was added 0.5 part 2,4,6-tris(dimethylamino-methyl) phenol and 12.5 parts diglycidyl ether of 2,2-bis(4-hydroxyl phenyl) propane.

Labels of these inks were printed on glass bottles which had a coating approximately 50 millimicrons thick of titanium dioxide which had been produced on the glass surface of the bottles by pyrolyzing tetraisopropyl titanate. After cooling, the printed labels were cured at a temperature in the range of 150°–200° F. for a period of 1–3 minutes.

All labels were exceedingly scratch and abrasion resistant, and resisted the effect of a 3.0% solution of sodium hydroxide maintained at a temperature of 140° F. for 25 minutes.

I claim:

1. A glass bottle coated with 5–100 millimicrons of a refractory metal oxide coating, the coating having printed thereon an ink having a binder of a cured terpolymer consisting essentially of 50–70% by weight styrene, 20–50% by weight 2-ethylhexyl acrylate, and 2–14% by weight of an organic acid selected from the group consisting of acrylic acid and methacrylic acid.

2. A glass bottle according to claim 1 wherein said terpolymer contains 10% by weight acrylic acid.

3. A glass bottle according to claim 1 wherein said terpolymer contains 65% by weight styrene.

4. A glass bottle according to claim 1 wherein said refractory metal oxide coating is about 50 millimicrons thick.

5. A glass bottle according to claim 1 wherein said refractory metal oxide coating comprises titanium dioxide.

References Cited

UNITED STATES PATENTS

| | | |
|---|---|---|
| 3,014,881 | 12/1961 | La Barre. |
| 3,057,812 | 10/1962 | Straughan. |
| 3,118,786 | 1/1964 | Katchman et al. _____ 117—211 |
| 3,202,054 | 8/1965 | Mochel _____ 117—69 X |
| 3,291,600 | 12/1966 | Nicol _____ 117—211 X |
| 3,323,889 | 6/1967 | Carl et al. |

ALFRED L. LEAVITT, *Primary Examiner.*

HERBERT COHEN, *Assistant Examiner.*

65—60; 117—72, 124

U.S. DEPARTMENT OF COMMERCE
PATENT OFFICE
Washington, D.C. 20231

UNITED STATES PATENT OFFICE
CERTIFICATE OF CORRECTION

Patent No. 3,441,424                          April 29, 1969

Nicholas C. Bolgiano

It is certified that error appears in the above identified patent and that said Letters Patent are hereby corrected as shown below:

Column 4, line 71, "Du Point" should read -- Du Pont --.
Column 5, line 11, "150°-200°" should read -- 150°-220° --.

Signed and sealed this 6th day of October 1970.

(SEAL)
Attest:

Edward M. Fletcher, Jr.                      WILLIAM E. SCHUYLER, JR.
Attesting Officer                              Commissioner of Patents